UNITED STATES PATENT OFFICE.

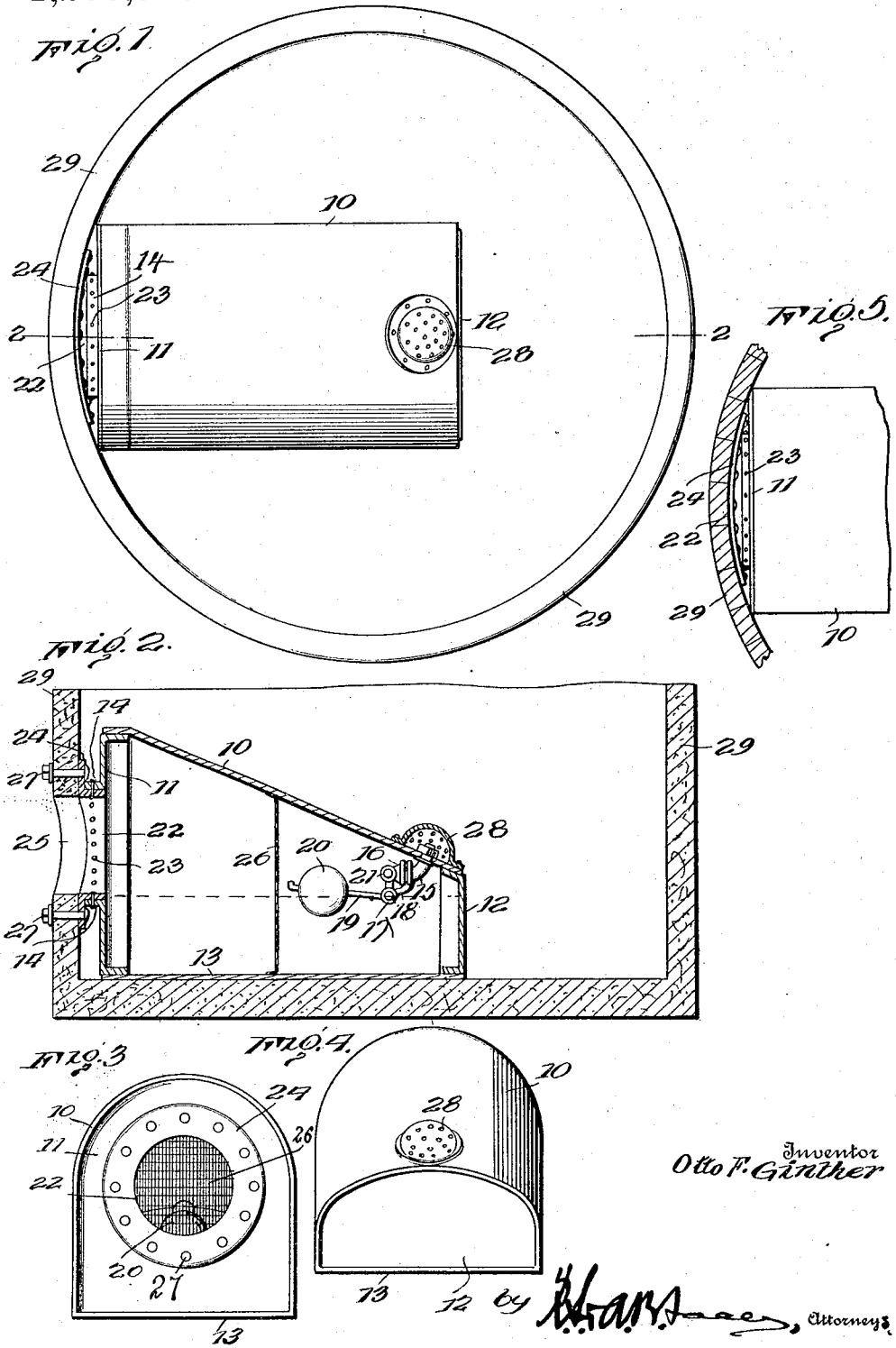

OTTO F. GINTHER, OF RIPPEY, IOWA.

STOCK-WATERING APPARATUS.

1,208,947. Specification of Letters Patent. Patented Dec. 19, 1916.

Application filed March 1, 1916. Serial No. 81,539.

*To all whom it may concern:*

Be it known that I, OTTO F. GINTHER, a citizen of the United States, residing at Rippey, in the county of Greene and State of Iowa, have invented certain new and useful Improvements in Stock-Watering Apparatus, of which the following is a specification.

This invention relates to improvements in stock watering devices, and has for one of its objects to provide a simply constructed device which may be connected into a reservoir or other source of supply of any suitable size and of any suitable construction, and by means of which fowls or animals of different sizes and species, may be supplied with water without danger of contaminating or wasting the water.

Another object of the invention is to provide a simply constructed device which may be associated with a reservoir or tank of any suitable size and in which provision is made for controlling the flow from the reservoir to the trough or receiver.

With these and other objects in view, the invention consists in certain novel features of construction, as hereinafter shown and described and then specifically pointed out in the claim; and in the drawings illustrative of the preferred embodiment of the invention Figure 1 is a plan view of the improved device arranged in a conventional tank or reservoir; Fig. 2 is a section on the line 2—2 of Fig. 1; Fig. 3 is a detached front elevation of the improved receptacle or trough; Fig. 4 is a detached rear elevation of the receptacle or trough; Fig. 5 is a detail view illustrating the manner of connecting the improved receptacle or trough in a tank constructed of wood or like material.

Corresponding and like parts are referred to in the following description and indicated in all the views of the drawings by the same reference characters.

The improved device comprises a receptacle or trough of any suitable material, preferably metal, and inclosed on all sides except for a relatively large opening, preferably at one end, and a relatively small opening, preferably near the other end, through which the inlet valve is coupled. The receptacle or trough comprises a shell including an intermediate body portion 10 having a relatively large front end 11 and a relatively small rear end 12. The bottom 13 of the receptacle is preferably flat, while the sides are preferably vertical and the top rounded and sloping gradually from the relatively large end 11 to the small rear end 12. The parts 10—11—12—13 are preferably constructed of galvanized iron or steel or of other material which is not liable to corrosion. The front 11 of the receptacle is provided with an opening surrounded by a flange 14, the bottom of the opening being located a considerable distance above the bottom 13 of the receptacle or trough, the distance between the bottom of the opening and the bottom of the trough representing the portion of the receptacle which contains the drinking water. The quantity of water will thus never be less in depth than the distance between the bottom of the opening and the bottom of the receptacle or trough. Fitting in the intake opening is a controlling faucet, represented as a whole at 15 and including a valve 16. Pivoted at 17, preferably to a bracket 18 extending from the shell of the valve, is a lever arm 19 having a float 20 at one end and pivotally connected at 21 at the other end to the valve 16. The lever arm is so constructed that when the valve 16 is closed the water will stand at the requisite level in the receptacle, or with its upper face substantially in alinement with the bottom of the opening to the receptacle or trough. By this arrangement if the water falls below a certain predetermined level the float by falling will open the valve and permit the water to flow until the requisite stage or level of water is restored. By this means the quantity of water in the reservoir is maintained at a uniform stage or level, as will be obvious.

Fitting within the opening of the receptacle and within the flange 14 is an annular coupling member 22 which is secured as by rivets 23 to the flange 14. The member 22 is likewise provided with a lateral flange 24. The reservoir or other receptacle for the supply of water may be of any suitable size and of any suitable material, and is represented as a whole at 29.

In Figs. 1 and 2 the reservoir is represented as if constructed of concrete, while in Fig. 5 a portion of the wall of the reservoir is shown and represented as if constructed of wood, but it is not desired to limit the invention to any particular or specific material. The reservoir is provided with an opening, indicated at 25, which registers with the annular member 22 of the receptacle or trough, so that when the receptacle is located within the reservoir the flange 24 will encompass the opening 25 of the reservoir, and the latter is then secured to the reservoir by bolts or rivets 27 which pass through the flange 24 and the adjacent portion of the reservoir. A suitable packing will preferably be employed between the flange 24 and the adjacent wall of the reservoir, to prevent leakage. A screen 26 of foraminous material will preferably be located within the receptacle 10 to protect the float and the valve mechanism. The passage defined by the opening 25 and the annular member 22 provides means for the entrance of the head of the animal, but will not be sufficiently large to permit the animal to pass bodily. A screen of suitable construction, indicated at 28 will be located over the intake end of the supply faucet 15, to prevent the passage of foreign matter from the reservoir into the receptacle or trough.

The receptacle may be of any suitable size to adapt the device to animals or fowls of different sizes or species, and the reservoir 24 may likewise be of any suitable size.

Having thus described the invention, what is claimed as new is:—

The combination with a reservoir having an opening in its side near its bottom, of a receptacle adapted to rest upon the bottom of the reservoir and provided in one end with an opening adapted to aline axially with the opening in the side of the reservoir, a screened inlet in the top of the receptacle at the opposite end of the same, means controlled by the level of liquid in the receptacle to cut off flow through said inlet, an outwardly projecting annular flange around the opening in the end of the receptacle, a collar fitting closely within said flange and constructed with a radially disposed flange fitting against the inner face of the side of the reservoir and around the opening therein, securing devices inserted radially through said collar and said flange on the receptacle, and securing devices inserted through the said radially disposed flange and the wall of the reservoir.

In testimony whereof I affix my signature.

OTTO F. GINTHER. [L. S.]

Copies of this patent may be obtained for five cents each, by addressing the "Commissioner of Patents, Washington, D. C."